UNITED STATES PATENT OFFICE.

CHARLES BASSALER, OF PARIS, FRANCE.

SUPPORTING DEVICE FOR SHEET-TREATING ROLLERS.

1,360,076. Specification of Letters Patent. Patented Nov. 23, 1920.

Application filed July 16, 1919. Serial No. 311,241.

*To all whom it may concern:*

Be it known that I, CHARLES BASSALER, citizen of the Republic of France, residing at Paris, Department of the Seine, in France, have invented new and useful Improvements in Supporting Devices for Sheet Treating Rollers, of which the following is a specification.

This invention relates to roller supporting devices for machines employed in the manufacture of cardboard boxes and other objects and in similar trades for working all kinds of sheet materials and it has for its object improvements in the construction and mode of assembling of said devices.

The word roller applies to disks having a circumferential rim, shaped according to the work to be performed such as tracing, stamping, slotting, printing, cutting, embossing, perforating, punching, etc., cardboard and other sheet material.

It is well known that the roller supporting devices are generally secured on the machine frame by means of a bolt head sliding in a dovetailed groove provided in the frame and that said roller supports can only be accurately set in position by means of successive regulations.

Consequently, when the operator sets the roller supports for a predetermined work, it is usual for him to present a gage or pattern sheet and bring the roller opposite the outline to be produced.

The device can only be moved when the bolt which presses it against the machine frame has been loosened but then the position of the apparatus is no longer assured and when the operator thinking that he has achieved the adjustment in position of the device tightens the clamping bolt to lock said device in position he finds frequently that the roller has altered its position and is no longer opposite the outline of the pattern.

The operator must then begin over again the same operation so that the adjustment of the device and of the roller is only effected by successive operations and fumbling.

Consequently it is practically impossible to set the rollers accurately in the required position by a single operation and without the use of gage sheet, the employment of a graduated scale is rendered useless, and the loss of time is considerable especially when several devices have to be adjusted.

It is well known that for instance for the tracing of the material the sheet is engaged between a smooth rotary cylinder and a tracing roller provided with a blade rotating with the sheet.

The same machine is frequently provided with several tracers and the exigencies of the trade often require a reduction of the width of the tracer support in order to bring the lines nearer.

This is true not only as regards the tracing roller but also concerning every other kind of rollers.

These rollers are generally mounted either upon a fixed or upon a rotary spindle turning simultaneously with the roller, but in all cases the spindle and the friction bearing are always very weak, which results in a considerable amount of wear that deprives rapidly the apparatus of the required accuracy.

In this way the roller becomes loosened both radially and laterally either in its bearing or upon its spindle, and this looseness increases during the action of the machine.

Finally, the assembling being faulty there are formed around the periphery of the roller flat parts which cause jamming and rapid wear of the parts.

The object of this invention is to avoid or reduce these inconveniences by means of improvements in the mode of construction and assembling of devices which shall be hereinafter described.

These improvements chiefly consist in mounting the rollers upon ball bearings, in suspending the support in guides, in engaging it with the frame by means of springs and, when required, in the utilization of the indications given by graduated scales to facilitate the adjustment, without the use of a pattern sheet, of devices for tracing slotting, guiding, printing, perforating, embossing, etc., in machines employed in the manufacture of bandboxes and other cardboard objects and of sheet materials.

The invention will now be described with reference to the annexed drawing which illustrate diagrammatically and by way of example one mode of execution of a tracing device in which the roller is mounted in a ball bearing.

Figure 1:
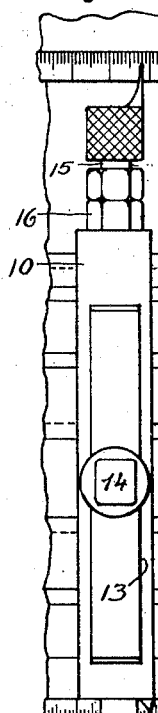
Figure 1 is a front elevation of the device with the roller support in section.

In the drawings 1 is the frame of a machine provided on one or two sides with roller devices.

The sides of the frame 1 are provided with dovetailed grooves 2 for the reception of the heads 3 of clamping bolts 4, and with other grooves 5 of trapezoidal section, in order to allow the hanging of the device and to compensate for wear. The grooves 5 can have any other appropriate shape in order to serve as guides for the projections 6 on the backs of the devices. If necessary, groove 7 may also be provided to hang the devices and to retain them in this position by means of small bars 8; finally graduated scales 9 are provided to determinate the position of the devices on the frame.

Said device consists of a socketed body 10 in which the shank 11 of the roller carrier 1 is lodged; a spring 13 which presses the body against the frame even when the clamping bolt is disengaged; a nut 14 which is screwed upon bolt 4 in order to press the device upon the frame; a regulating screw 15 with nuts 16 designed to move the shank 11 and to ascertain the position of the roller; and lower pointers 17 fixed upon the body for coöperation with the graduations upon the scales 9. The clamping bolt 4 is flattened, as shown, and passes through correspondingly shaped, registering slots $10^1$ and $11^1$ in the body 10 and shank 11, respectively, the shank slot $11^1$ being somewhat longer than the slot $10^1$ in order to permit the vertical adjustment of the shank. This adjustment, as will be understood, is effected by turning the screw 15 in the proper direction, the lower portion of the screw threading into an opening in the upper end of the shank.

The roller carrier consists of a ring piece 12 to which the shank 11 is integrally connected, said ring piece being provided with a key guide 18 which prevents the shank from turning, while still permitting its vertical sliding movement.

The ring piece 12 carries a ball bearing comprising, as shown in Fig. 1, outer and inner rings 19 and 21 and an interposed series of balls 20; the outer ring 19 being fixed to the roller 22 for performing the tracing, scoring or other operation, while the inner ring 21 is mounted on a spindle 23 which, in turn, is fixed to a cover plate 24 which may be made integral with, or otherwise rigidly secured to the carrier ring 12. Hence, in this form, the roller 22 and the outer ring 19 turn together, and the inner ring 21 is relatively stationary. The precise manner of connecting together the parts 19 and 22, and the parts 21, 23, 24 and 12, is, of course, immaterial and for that reason requires no special illustration.

Figure 2:
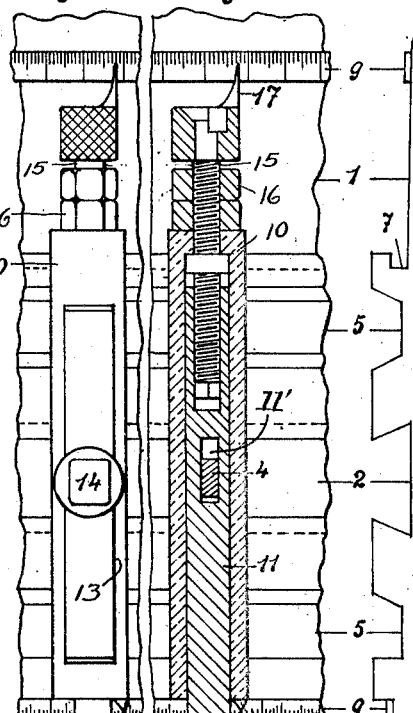
Fig. 2 is a sectional view of the device showing a modification in the mode of mounting the roller.
Figure 3:
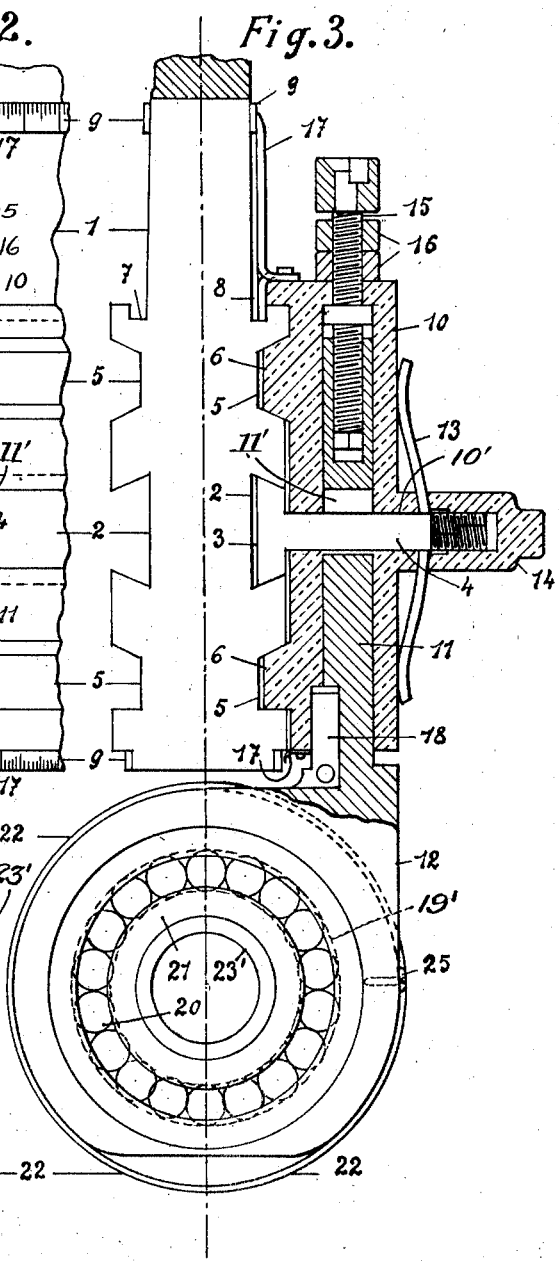
Fig. 3 is a part sectional view of the device shown in Fig. 2 the cover plate being omitted.

Figs. 2 and 3 show a slightly modified mounting for the roller, according to which said roller is fixed to the inner ring $21^1$, the latter in such case turning with the roller which is provided with an axial throat $23^1$. This throat is supported to turn on an axial hub or collar which forms an integral part of the cover plate $24^1$. The outer ring $19^1$ is fastened to the carrier ring 12 by means of a screw 25 or equivalent device.

The working of the device is the following:

When desired to put the device in or out of position it is necessary to unscrew a little the nut 14 to move the device and bring it in the desired position and then to tighten the nut 14. The vertical adjustment of the roller 22 is effected in the usual manner by means of screw 15.

It will be noted that during its run upon frame 1 the body 10 is guided and retained by the groove 5, that it may remain suspended by the small bar 8 and is applied to the frame by means of spring 13, so that the device is not moved far from its normal position and that it occupies relatively to the frame during its movement and adjustment the same position it occupied when locked in position.

Owing to the improved construction as above specified the use of graduated scales is made possible, the pointers which are fixed to the body 10 indicating at all times the position which the roller will occupy when locked. In this manner the adjustment of the rollers can be effected in one operation only and even without a gage, the setting in position of the device being thus simplified and rendered more easy.

It will be understood that the graduated scales can be placed at any other point according to the wants and necessities of the work in hand.

It will also be seen that the use of a ball bearing is not designed essentially to reduce the effort required to rotate the roller but that this particular mode of assembling is particularly designed to reduce the total width of the roller support, to strengthen the system, to reduce wear, to avoid deformation of the bearing parts, to prevent distortion of the roller and its consequences, to increase the accuracy of action and the life of the parts and finally to allow of interchanging the roller for a given work without replacing the device.

It must be understood that the mode of construction and the assembling of the roller devices above described and indicated apply to all devices used for tracing, stamping, slotting, printing, cutting, guiding, perforating, embossing, etc., in machines employed in the manufacture of cardboard objects and the like and the working of sheet material.

Having thus described my invention and ascertained its nature and the way it can be put in practice, I declare that what I claim is:—

1. In a machine of the character described, the combination, with a frame provided with guide grooves; of a socketed body having projections on its back wall slidably engaged in said grooves; a clamping bolt carried by said body and engageable with said frame to lock the former in adjusted position; a tightening nut on said bolt; a spring associated with said bolt to press said body against the frame when the bolt has been loosened; a carrier ring having a vertical shank adjustably fitting in the socket in said body; a ball bearing mounted in said ring; a roller connected to one member of the ball bearing; and coöperating scale and pointer devices on the frame and body to indicate the position of the roller relative to said frame.

2. In a machine of the character described, the combination, with a frame provided with guide grooves; of a socketed body having projections on its back wall slidably engaged in said grooves; a roller support having a vertical shank slidably fitting in the socket in said body; a roller carried by said support; a regulating screw mounted in the top of said body in line with said socket and engaged with said shank to adjust its position; and coöperating scale and pointer devices on the frame and body to indicate the position of the roller relative to said frame.

3. In a machine of the character described, the combination, with a frame provided with guide grooves; of a body having projections on its back wall slidably engaged in said grooves, said body being formed with a vertical socket and with a transverse slot intersecting the same; a roller support having a shank slidably fitting in said socket and formed with a slot which registers with the first named slot but which is of greater height than that slot; a clamping bolt extending through said slots and engageable with said frame to lock said body in adjusted position with respect thereto; a roller carried by said support; and a regulating screw mounted in the top of said body in line with said socket and engaged with said shank to adjust its position, said shank moving relatively to said bolt during its adjustment.

4. In a machine of the character described, the combination, with a frame; of a socketed body arranged to slide along the frame, said frame and body having coöperating guide means for controlling the sliding movement of the body; a roller support having a vertical shank slidably engaged in the socket in said body; a clamping bolt carried by said body and engageable with said frame to lock the former in adjusted position; a tightening nut on said bolt; a spring associated with said bolt to press said body against said frame when the bolt has been loosened; and a roller carried by said support.

5. In a machine of the character described, the combination, with a frame; of a socketed body arranged to slide along the frame, said body having a transverse slot formed through it and which intersects the socket, and said body and frame having coöperating guide means for controlling the sliding movement of the body; a roller support having a vertical shank slidably fitting in said socket and formed with a slot which registers with the first named slot but which is of greater height than that slot; a clamping bolt extending through said slots and engageable with said frame to lock said body in adjusted position with respect thereto; and means engaged with said shank to adjust its position in said socket, said shank moving relatively to said bolt during its adjustment.

6. The combination, with a frame; of a body slidably related thereto and having a vertical socket; means for locking said body in adjusted position on said frame; a roller support having a vertical shank adjustably fitting in said socket; a ball bearing mounted in said support and comprising outer and inner rings and an interposed series of balls, one of said rings being rotatable relative to the other; a roller connected to the rotatable ring at one side of the bearing; and a cover plate at the other side of the bearing.

In testimony whereof I have signed my name to this specification in the presence of two subscribing witnesses.

CHARLES BASSALER.

Witnesses:
 CHAS. P. PRESSLY,
 VICTOR MARENDOWSKY.